United States Patent [19]

Ebbing

[11] Patent Number: 4,579,039

[45] Date of Patent: Apr. 1, 1986

[54] POWER DRIVE UNIT

[75] Inventor: Steven J. Ebbing, Rockford, Ill.

[73] Assignee: Sundstrand Corporation, Rockford, Ill.

[21] Appl. No.: 560,857

[22] Filed: Dec. 12, 1983

[51] Int. Cl.$^4$ ............................................. F01B 3/06
[52] U.S. Cl. ....................................... 91/166; 91/380; 91/506; 60/451
[58] Field of Search ................. 91/380, 504, 505, 506, 91/421, 166; 60/451, 230, 379, 459, 466; 417/222; 239/265.29, 265.31

[56] References Cited

U.S. PATENT DOCUMENTS

| | | | |
|---|---|---|---|
| 3,789,736 | 2/1974 | Williams | 91/166 |
| 3,791,586 | 2/1974 | Moorehead | 239/265.29 |
| 4,191,094 | 3/1980 | Flippo | 91/380 |
| 4,210,066 | 7/1980 | Aldrich | 91/506 |
| 4,213,298 | 7/1980 | Milgram | 60/369 |
| 4,422,605 | 12/1983 | Fage | 239/265.29 |

Primary Examiner—Robert E. Garrett
Assistant Examiner—John M. Husar
Attorney, Agent, or Firm—Wood, Dalton, Phillips, Mason & Rowe

[57] ABSTRACT

A power drive unit for thrust reverser structure includes a reversible motor in a hydraulic circuit and has normal stow and deploy cycles of operation. In a deploy cycle, the load on the motor is aiding and, in the event the deploy cycle is inadvertent, the load on the motor can be substantially higher. In order to avoid this increased loading on the motor in an inadvertent deploy cycle, the hydraulic circuit has an auto-restow valve which senses the high aiding load in the event of an inadvertent deploy operation and changes the operation of the power drive unit to operate the motor in a stow cycle to prevent continued high loading on the motor and thrust reverser structure.

6 Claims, 2 Drawing Figures

POWER DRIVE UNIT

TECHNICAL FIELD

This invention pertains to a power drive unit for thrust reverser structure associated with a jet fan engine. The thrust reverser structure is operable in stow and deploy cycles between stowed and deployed positions and the power drive unit has a hydraulic circuit including a hydraulic motor for operating the thrust reverser structure in these two modes of operation. In the event there is an inadvertent deploy of the thrust reverser structure, the loading on the mechanism can be substantially higher than in a normal deploy cycle and normally the motor is designed to accommodate such high load operation. This invention pertains to a power drive unit which senses an inadvertent deploy operation and causes the thrust reverser structure to return to the stowed position whereby the motor minimum displacement can be down-sized to match the load requirements in normal stow and deploy cycles.

BACKGROUND ART

Examples of previously known power drive units are shown in the Flippo U.S. Pat. No. 4,191,094 and Aldrich U.S. Pat. No. 4,210,066, which are owned by the assignee of this application. In the power drive unit, a hydraulic motor is operatively connected to the thrust reverser structure and is in a hydraulic circuit including control valves for causing the motor to operate to either cause a stow or deploy cycle of the thrust reverser structure. In the Flippo patent, the motor has a torque control wherein the displacement of the motor may be varied to modify the torque/speed operation of the motor.

The prior art power drive units have not had an auto-restow valve which reacts to an excessive pressure in the motor discharge line resulting from a high load in an inadvertent deploy cycle to cause a reversal in direction of operation of the motor to return the thrust reverser structure to a stowed position.

DISCLOSURE OF THE INVENTION

A primary feature of the invention is to provide a power drive unit for thrust reverser structure having a hydraulic circuit with a reversible motor operatively connected to the thrust reverser structure and means for sensing an excessive load on the thrust reverser structure resulting from an inadvertent deploy cycle to terminate the deploy cycle and return the thrust reverser structure to a stowed position.

In operation of the thrust reverser structure, a power drive unit includes a reversible hydraulic motor operatively connected to the thrust reverser structure and which operates in one direction to deploy the thrust reverser structure, with the cycle resulting in an aiding load on the motor. In a normal deploy cycle, there is a design load on the structure. If, through some control failure, there is an inadvertent deploy cycle, as when there is high thrust operation of the engine, there can be a much higher load on the structure and the large ratio of this load to the normal load results in consuming larger amounts of hydraulic flow through the motor to prevent the motor from overpressurizing. Because of this, the inadvertent deploy load determines the flow consumption for the system for all normal operations. This establishes a designed minimum displacement for the motor.

This invention embodies the use of an auto-restow valve in the hydraulic circuit which senses a pressure in the motor discharge line (resulting from an aiding load higher than in a normal deploy cycle) in excess of a predetermined value and which operates to interrupt the deploy cycle and cause the motor to operate to return the thrust reverser structure to stowed position. Since the hydraulic motor does not have to react to any aiding load higher than that occurring in the normal deploy cycle, the minimum displacement of the motor can be down-sized to match the normal load requirements. The lower minimum displacement results in an increased maximum speed of operation and less flow of oil in the hydraulic circuit. Also, the actuating mechanism for the thrust reverser structure can be down-sized because of lesser loading thereon.

Still another feature of the invention is to provide a power drive unit having a hydraulic circuit with a reversible hydraulic motor operatively connected to thrust reverser structure, a discharge flow-regulating valve connected to a discharge line from the motor for controlling the speed of the motor, and an auto-restow valve which is pressure-responsive being connected to said discharge line. When a pressure signal resulting from a pressure exceeding a predetermined value is applied to the auto-restow valve, there is a resulting shift in position of a motor control valve whereby the motor which has been operating in a direction to cause a deploy of the thrust reverser structure is caused to reverse its direction of operation and move the thrust reverser structure to a stowed position.

An object of the invention is to provide a power drive unit for two-directional operation of a mechanism and having a hydraulic circuit including a reversible hydraulic motor and a motor control valve for controlling the flow of oil to said motor characterized by control means for sensing the pressure of oil discharged by said motor when the motor is operating in one direction with an aiding load and when said pressure exceeds a predetermined value operating said motor control valve to reverse the direction of operation of the motor.

BEST MODE FOR CARRYING OUT THE INVENTION

Figure 1A:
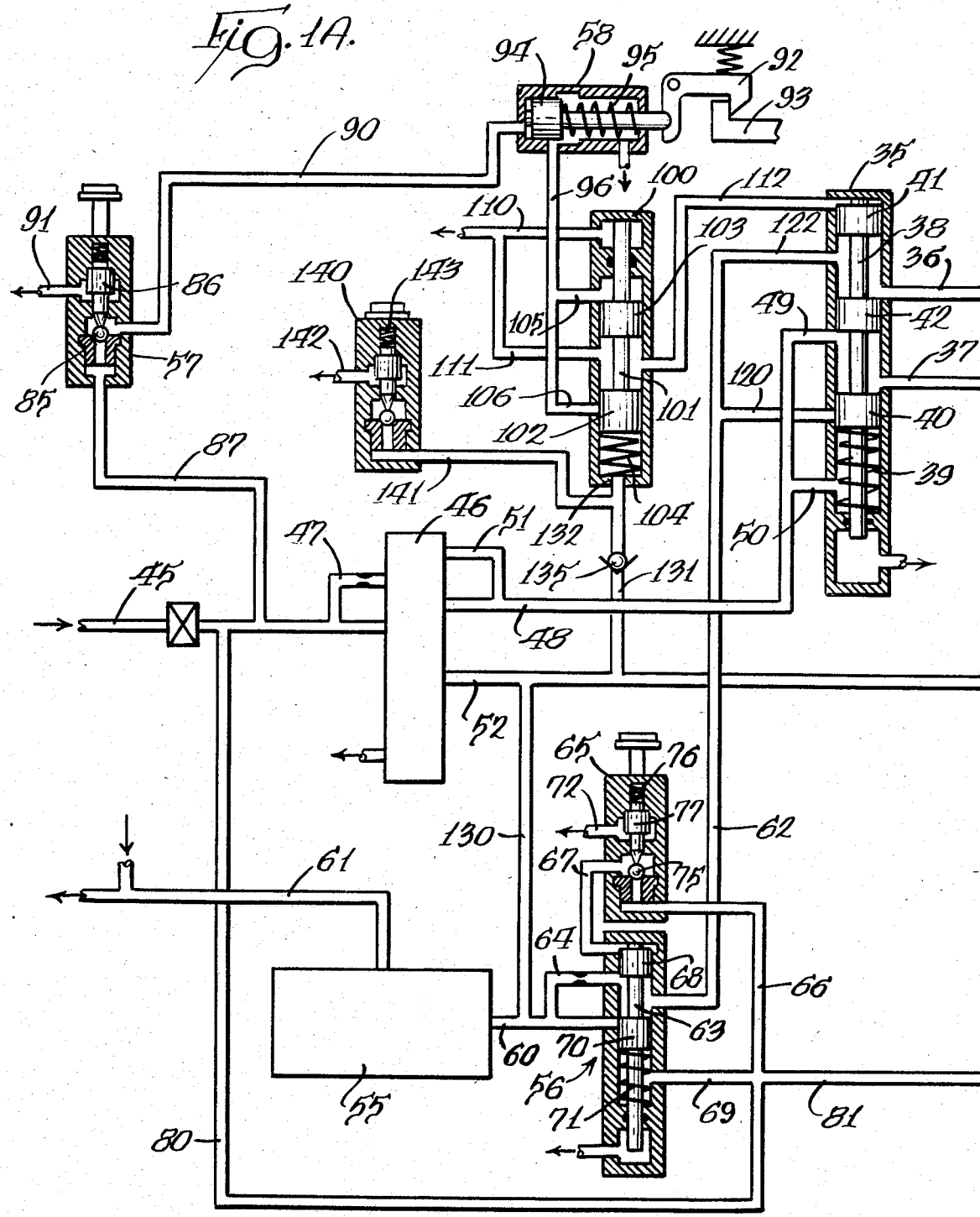
FIG. 1A is a schematic of a portion of the power drive unit with certain components shown in central vertical section and which joins with the portion of the power drive unit shown in FIG. 1B.
Figure 1B:
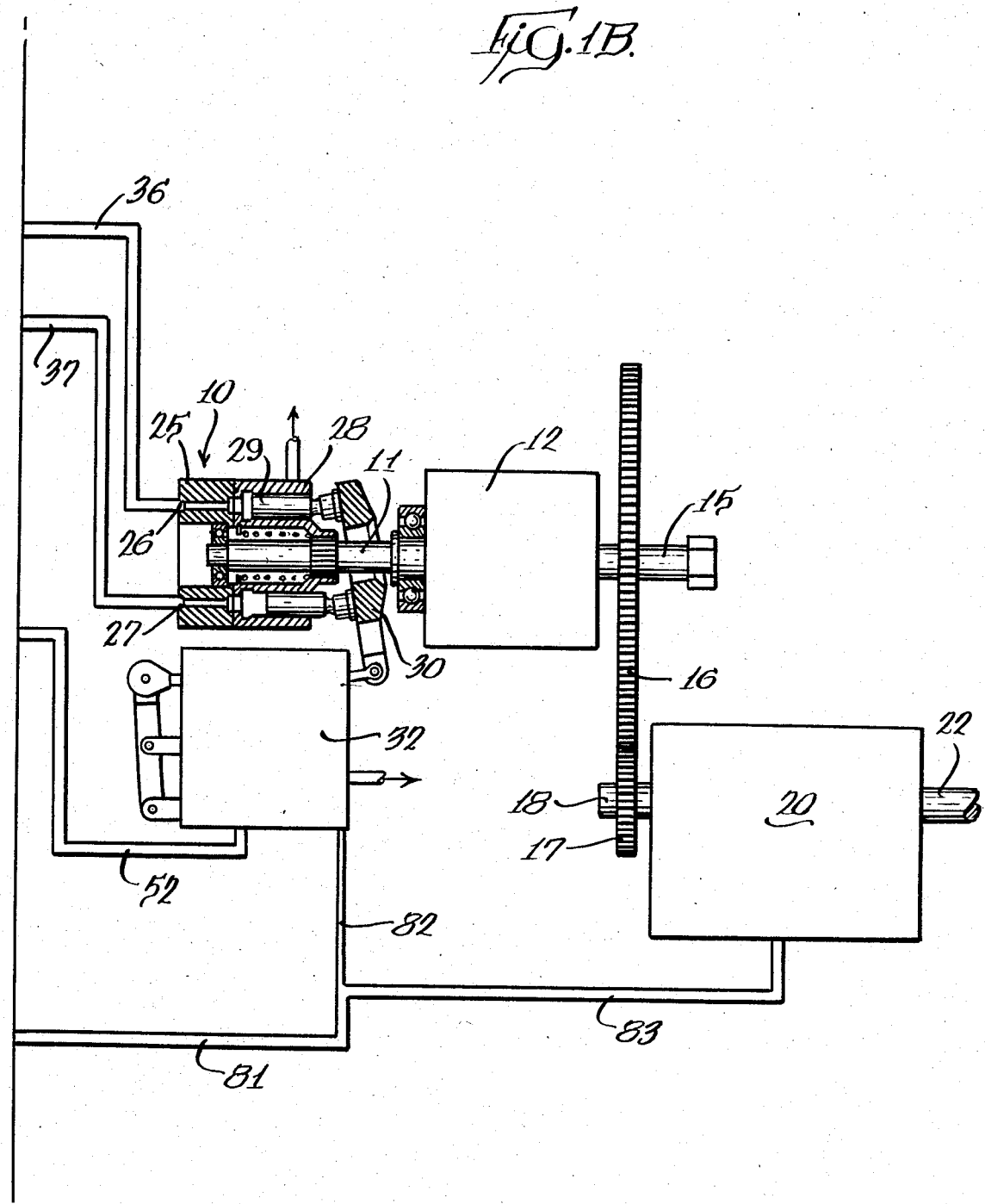
FIG. 1B is a schematic of a portion of the power drive unit with certain components shown in central vertical section and which joins with the portion of the power drive unit shown in FIG. 1A.

The power drive unit, as shown in FIG. 1B, has a hydraulic motor 10 for driving an output shaft 11 which drives the input of a torque-limiting ratchet clutch 12. A clutch output shaft 15 has a gear 16 which meshes with a gear 17 on an input shaft 18 of a pressure-releasable brake 20 and with the input shaft 18 being connected to an output shaft 22.

A number of the components of the power drive unit including the motor 10, the clutch 12 and the brake 20 as well as several additional components to be described are basically of the same structure as that disclosed in the Flippo U.S. Pat. No. 4,191,094. The aforementioned components are not described in detail and the disclosure of the Flippo patent is incorporated herein by reference and reference may be made thereto for more detailed description of said components.

The shaft 22 may be a flexible shaft which connects to thrust reverser structure for a jet fan engine. More particularly, the flexible shaft may connect to ball screw actuator assemblies whereby rotation of the motor 10 in one direction will cause the thrust reverser structure to move from a stowed position to a deployed position in a deploy cycle. Operation of the motor in the other direction will cause the thrust reverser structure to move from a deployed position to a stowed position in a stow cycle.

The hydraulic motor 10 is shown diagrammatically and has a valve block 25 with a pair of ports 26 and 27 for directing flow of oil to a series of longitudinal bores in a rotatable cylinder block 28 connected to the output shaft 11. The longitudinal bores each mount a piston 29 movable therein and with the stroke of the pistons being controlled by a variable position wobbler 30. The wobbler 30 is shown in a position to establish an intermediate displacement setting for the motor, with clockwise movement thereof resulting in reducing the displacement of the motor and counterclockwise movement increasing the displacement of the motor. The position of the wobbler is controlled by a torque control unit 32 which senses torque and controls displacement of the motor and with this unit being more particularly described in the previously-referred to Flippo patent.

The hydraulic motor 10 is in a hydraulic circuit, shown more particularly in FIG. 1A. The hydraulic circuit includes a motor control valve 35 having fluid lines 36 and 37 which connect to the motor ports 26 and 27, respectively. The motor control valve 35 has a valve member 38 movable between a stow position, shown in FIG. 1A, and a deploy position wherein the valve member is in a lower position after movement against the urging of supply pressure and a spring 39 which is seated between a flange in the casing of the valve and a land 40 on the valve member. The valve member 38 has the additional lands 41 and 42. The land 40 has a lesser area than land 41 exposed to supply pressure whereby, when supply pressure acts on both, there will be a downward force overcoming the spring 39.

A supply line 45 supplies oil under controlled pressure to the motor control valve 35 by flow through a motor pressure compensator valve 46 which is of the same construction as the motor pressure compensator valve shown in the Flippo patent. An arming valve, not shown, is operable to establish pressure oil flow to the supply line 45. The supply line 45 extends to the motor pressure compensator valve 46 and has a branch line 47 with an orifice. The motor pressure compensator valve, as described in the Flippo patent, functions to protect the motor 10 by limiting motor pressure when the thrust reverser structure is acting to place an aiding load on the motor in a deploy cycle, rather than a resisting load in a stow cycle. Upon start-up, oil flows through the supply line 45 to a line 48 extending to the motor control valve 35 and having the branches 49 and 50. Initial flow is through the orifice branch supply line passage 47 and, thereafter, flow through a branch 51 of the line 48 causes downward movement of a valve member within the motor pressure compensator valve wherein flow can pass through the valve without flowing through the orificed branch supply line 47. Discharge pressure from the motor is applied against the valve member through a line 52 in opposition to pressure being delivered to the motor control valve 35 whereby an increase in pressure in line 52 can cause a reduction in inlet pressure at the motor.

Additional components of the hydraulic circuit which are conventional include a discharge flow-regulating valve 55 which controls the speed of the motor 10, a snub valve, indicated generally at 56, which reduces the speed of the motor during the final movement of the thrust reverser structure to stowed and deployed positions, a deploy solenoid valve 57 and a latch and piston interlock 58.

The discharge flow-regulating valve connects to a discharge line 60 which receives flow from the motor 10 through the lines to be described and also has a connection to a return line 61. The discharge flow-regulating valve is of the same construction as that shown in the Flippo patent and operates to sense a pressure drop proportional to flow and when the differential pressure reaches a certain value a valve member within the valve shifts to restrict the flow through the valve.

The snub valve 56 (shown in snub position) receives flow from the motor 10 through a line 62 extending to the motor control valve 35. When the thrust reverser structure is moving at slow speed, a valve member 63 has its lands positioned whereby oil can flow through the snub valve discharge only through a discharge line branch 64 which has an orifice. This snub operation occurs when the snub solenoid valve 65 is closed, as shown. When the snub solenoid valve is in open position, supply pressure in a line 66 can flow through the snub solenoid valve to a line 67 connected to the upper end of the snub valve 56 and act against a valve land 68. Supply pressure in a line 69 acts against a land 70 in opposition to the supply pressure acting on land 68 and a spring 71. The area of land 68 exposed to pressure is greater than the area of the land 70 whereby when the snub solenoid valve 65 is open, supply pressure acts against both lands and the greater force resulting from pressure acting on the land 68 urges the valve member 63 downwardly against the force of spring 71 whereby oil discharged from the motor can flow to the discharge line 60 without flow through the branch 64 having the orifice. When the snub action is to occur, the snub solenoid valve is operated, as by a solenoid, to a closed position wherein supply pressure is blocked from the line 67 and the line 67 can discharge to a return line 72.

The construction of the snub solenoid valve 65 is generally similar to that of the deploy solenoid valve 67 and with the construction being similar to that as particularly described with reference to the solenoid pilot valve 90 in the Flippo patent. A ball valve member 75 is urged to a closed position by a spring 76 acting on a solenoid armature 77. The snub solenoid valve would be held open by energization of the solenoid and the ball valve member closes a return line passage. When the solenoid is deenergized the valve will close and be in the position shown.

The supply line 45 connects to a line 80 which provides supply pressure to the lines 66 and 69 associated with the snub valve and also to a line 81 which connects to a line 82 leading to the torque control unit 32 and to a line 83 extending to the brake 20. When the arming valve is opened, supply pressure acts at the brake 20 through the line 83 to release the brake whereby the thrust reverser structure operating shaft 22 can be rotated.

The deploy solenoid valve 57 has the ball valve member 85 and solenoid armature 86 and has an inlet connection to a line 87 extending to the supply line 45. When the deploy solenoid valve is opened, supply pressure can flow therethrough to a line 90 which connects to the latch and piston interlock 58. When the deploy solenoid valve is closed, oil in the line 90 can return from the latch and piston interlock unit 58 to a return line 91. The latch and piston interlock unit includes a pivoted latch 92 which, in the position shown, can engage part of a thrust reverser structure 93 to hold the structure in stowed position. The latch is released by movement of a piston 94 to the right against the action of a spring 95 under the urging of supply pressure in line 90. The piston 94 serves as an interlock whereby after the latch is pivoted to a release position, supply pressure can flow to a line 96.

As shown, the motor control valve 35 is in its stow position whereby when the arming valve is opened supply oil can flow to the motor control valve and through line 37 to the motor port 27 to cause rotation of the motor to move the thrust reverser structure in a stow cycle toward a stowed position. As previously mentioned, the snub valve is positioned during the end of this cycle to cause the motor to operate at a relatively slow rate of speed.

Assuming the thrust reverser structure is stowed and is to be deployed, the arming valve is again opened and the deploy solenoid valve is opened by energization of a solenoid whereby supply pressure flows through line 90 to release the latch 92 and to permit supply pressure to reach the line 96.

For the deploy cycle, the motor control valve must have its valve member 38 moved to its deploy position against the urging of the spring 39 and pressure acting on the land 40. This action is achieved in a different manner than previously known in the art by use of an auto-restow valve which is a pressure-sensing valve and which, in addition to normally controlling the position of the motor control valve, also responds to an excessive pressure in the motor discharge line while the motor is operating in a deploy cycle to reverse the cycle and cause the motor to operate in a stow cycle. The auto-restow valve is identified at 100 and has a valve member 101 with the lands 102 and 103. The valve member is normally urged to a stow position, as shown in FIG. 1A, by means of a spring 104. The line 96 extending from the latch and piston interlock unit has branches 105 and 106 connected to the auto-restow valve. A return line has branches 110 and 111 connected to the auto-restow valve. A line 112 extends between the auto-restow valve and an upper end of the motor control valve 35.

In a normal stow operation, there is no pressure in the line branches 105 and 106 communicating with the latch and piston interlock unit 58 whereby the spring 104 can urge the valve member 101 of the auto-restow valve to its upper position. In this stow position, the upper end of the motor control valve 35 is connected to a return line branch 111 through the line 112 whereby the spring 39 of the motor control valve can urge the valve member 38 to its upper position, as shown in FIG. 1A.

When a deploy cycle is to occur, supply pressure passes through the latch and piston interlock unit 58 in the manner previously described whereby supply pressure in branch line 105 acts on the upper end of the valve land 103 through the line 105 to urge the valve member 101 downward against the urging of the spring 104. This, then, places the branch line 106 in communication with the line 112 extending to the upper end of the motor control valve 35 whereby supply pressure acts on the upper side of the land 41 of the motor control valve member 38 to urge the valve member downwardly to the deploy position. This connects the supply pressure branch line 49 to the line 36 leading to the motor port 26. The motor port 27 connects to the snub valve 56 through line 37, line 120 and line 62. The line 62 has an additional branch 122 extending from motor control valve 35 which, when the latter valve is in the stow position, receives return flow from the motor through the line 36. Thus, the discharge from the motor in both directions of operation reaches the line 62 which connects to the snub valve 56.

Assuming there is an inadvertent deploy operation, as by a malfunctioning in the control of the deploy solenoid valve 57, a normal deploy operation will commence and control pressure will cause the auto-restow valve member 101 to move downwardly to the deploy position with the result that the motor control valve member moves downwardly to a deploy position. At this time, return flow from the motor through line 37 flows to the line 62 leading to the snub valve and flow passes therethrough to the discharge line 60 to the discharge flowregulating valve. The pressure in the discharge line 60 is sensed at the auto-restow valve through a line 130 which connects the discharge line to the previously-mentioned line 52 and a line 131 extending from the line 52 to a sensing port 132 at an end of the auto-restow valve.

In an inadvertent deploy operation, there is excessive loading on the motor 10 with an increase in pressure of oil in the discharge line 60 and when this pressure exceeds a predetermined value, the valve member 101 of the auto-restow valve, which has been in its lower position, is caused to move upwardly to the stow position, shown in FIG. 1A, by a force which exceeds that resulting from pressure acting on the valve land 103. This results in pressure leaving an end of the motor control valve 35 through the line 112 and the spring 39 pressure on land 40 urges the valve member 38 of the motor control valve to the upper stow position whereby direction of flow to the motor is reversed and the motor is caused to operate in a stow cycle.

The value of the pressure signal at which the auto-restow valve will shift to its stow position is determined by the relative areas of an end of the land 102 exposed to the pressure signal and an area of the land 103 of the auto-restow valve which is exposed to supply pressure through the branch line 105.

The line 131 has a zero-leak check valve 135 which blocks oil flow from the auto-restow valve toward the discharge line 60 whereby the pressure signal applied to the auto-restow valve is held to lock the latter valve in the stow cycle position. When the deploy solenoid valve 57 is deenergized to remove the deploy signal, the latch 92 becomes operative and a reset valve 140 is energized briefly to bleed off the trapped pressure signal applied to the auto-restow valve whereby the latter valve is again in condition for normal operation in stow and deploy cycles. The reset solenoid valve 140 has an inlet connected to the sensing port 132 of the auto-restow valve by a line 141 and has an outlet to a return line 142. The connection between these lines is blocked when the solenoid associated therewith is deenergized and a ball valve member is held closed against its seat by a spring 143 acting against the armature similarly to the deploy solenoid valve previously described.

In addition to controlling the operation of the motor control valve in normal stow and deploy cycles, the auto-restow valve functions to cut off a torque peak, in the event of an inadvertent deploy operation, and therefore the maximum design torque of the power drive unit can be less. As the maximum design torque is less, then the minimum displacement of the motor can be less. The reduction in the minimum displacement of the motor results in less flow consumption during operation and a faster speed of operation of the thrust reverser structure.

I claim:

1. A power drive unit for thrust reverser structure operable in two directions comprising, a hydraulic circuit including a reversible hydraulic motor, a motor control valve having stow and deploy positions for controlling the direction of oil flow to said motor, control means including a pressure-sensing auto-restow valve for sensing the pressure of oil discharged by said motor when the motor control valve is in the deploy position and the motor is operating in one direction with an aiding load and when a pressure signal exceeds a predetermined value causing said motor control valve to shift to the stow position and reverse the direction of operation of the motor, said control means including a valve in a discharge line for regulating the discharge oil flow from the motor and said auto-restow valve having means connected to said discharge line and movable to a position to cause shift of said motor control valve to said stow position, and a check valve being positioned in said fluid line to prevent flow of oil from said auto-restow valve to said discharge line to hold said pressure signal.

2. A power drive unit as defined in claim 1 including pressure signal removing means.

3. A power drive unit for two-directional operation of a mechanism and having a hydraulic circuit including a reversible hydraulic motor and a motor control valve for controlling the flow of oil to said motor characterized by control means for sensing the pressure of oil discharged by said motor when the motor is operating in one direction with an aiding load and when said pressure exceeds a predetermined value operating said motor control valve to reverse the direction of operation of the motor, said control means including a valve in a discharge line for regulating the discharge oil flow from the motor, a pressure-sensing valve having a sensing port connected to said discharge line and movable to a position to operate said motor control valve when said pressure exceeds a predetermined value, a fluid line connecting said discharge line and the sensing port of said pressure-sensing valve, a check valve positioned in said fluid line to prevent flow of oil from said sensing port to said discharge line to hold a pressure signal at said sensing port, and means operable to remove said pressure signal from said sensing port.

4. A power drive unit as defined in claim 3 wherein said pressure signal removing means includes a second fluid line connected to said first-mentioned fluid line, and a valve selectively operable to connect said second fluid line to a return line.

5. A power drive unit for a thrust reverser having structure movable in opposite directions in stow and deploy cycles between stowed and deployed positions comprising: a reversible hydraulic motor having a pair of ports; a motor control valve connectable to a controlled pressure line and a discharge line and having stow cycle and deploy cycle positions to control the direction of oil flow to and from said motor ports and urged to a stow cycle position to cause the motor to operate in a stow cycle; pressure-sensing valve means for controlling the position of said motor control valve and shifting said motor control valve to said deploy cycle position, said pressure-sensing valve having a valve member with stow cycle and deploy cycle positions and urged to a stow cycle position, means responsive to a continuously-applied deploy cycle signal for moving the pressure-sensing valve member to a deploy cycle position to move the motor control valve to a position to cause the motor to operate in a deploy cycle, and means operative during application of said deploy cycle signal and responsive to a stow cycle signal established by pressure in said discharge line exceeding a predetermined value for moving the pressure-sensing valve member to a stow cycle position to permit the motor control valve to move to its stow cycle position; means for holding said stow cycle signal until the deploy cycle signal is discontinued; and means for releasing said stow cycle signal after said structure is in stowed position, said means for holding said stow cycle signal comprising a check valve positioned to block flow of oil from the pressure-sensing valve to said discharge line.

6. A power drive unit for a thrust reverser having structure movable in opposite directions in stow and deploy cycles between stowed and deployed positions comprising: a reversible hydraulic motor having a pair of ports; a motor control valve connectable to a controlled pressure line and a discharge line and having stow cycle and deploy cycle positions to control the direction of oil flow to and from said motor ports and urged to a stow cycle position to cause the motor to operate in a stow cycle; pressure-sensing valve means for controlling the position of said motor control valve and shifting said motor control valve to said deploy cycle position, said pressure-sensing valve having a valve member with stow cycle and deploy cycle positions and urged to a stow cycle position, a piston on said valve member responsive to a continuously-applied deploy cycle signal for moving the pressure-sensing valve member to a deploy cycle position to move the motor control valve to a position to cause the motor to operate in a deploy cycle, a second piston on said valve member responsive to a stow cycle signal established by pressure in said discharge line exceeding a predetermined value for moving the pressure-sensing valve member against the force of the deploy cycle signal to a stow cycle position to permit the motor control valve to move to its stow cycle position; a check valve for holding said stow cycle signal until the deploy cycle signal is discontinued; and a selectively operable valve for releasing said stow cycle signal after said structure is in stowed position.

* * * * *